United States Patent
Bergstrom et al.

(10) Patent No.: US 11,493,405 B2
(45) Date of Patent: Nov. 8, 2022

(54) DEVICE FOR IDENTIFYING A TYPE OF A BEARING

(71) Applicant: Aktiebolaget SKF, Gothenburg (SE)

(72) Inventors: Joakim Bergstrom, Luleå (SE); Per-Erik Larsson, Lulea (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/171,031

(22) Filed: Feb. 9, 2021

(65) Prior Publication Data
US 2021/0310902 A1 Oct. 7, 2021

(30) Foreign Application Priority Data
Apr. 1, 2020 (DE) .......... 102020204228.4

(51) Int. Cl.
*G01M 13/045* (2019.01)
*G01H 1/00* (2006.01)

(52) U.S. Cl.
CPC .......... *G01M 13/045* (2013.01); *G01H 1/003* (2013.01)

(58) Field of Classification Search
CPC ............... G01M 13/045; G01H 1/003
See application file for complete search history.

(56) References Cited

U.S. PATENT DOCUMENTS

| | | | |
|---|---|---|---|
| 6,053,047 A * | 4/2000 | Dister ................ | G01M 13/028 73/660 |
| 6,262,550 B1 * | 7/2001 | Kliman .............. | G05B 23/0264 318/565 |
| 2003/0030565 A1 * | 2/2003 | Sakatani ............ | G01M 13/045 340/682 |
| 2005/0096873 A1 * | 5/2005 | Klein ................. | G01H 1/006 702/184 |
| 2010/0030493 A1 * | 2/2010 | Rao .................... | G01H 1/003 73/660 |
| 2013/0013138 A1 * | 1/2013 | Lu ..................... | B60L 3/0061 702/34 |
| 2014/0142872 A1 * | 5/2014 | Hedin ................ | G05B 23/024 702/56 |
| 2015/0059478 A1 * | 3/2015 | Klos .................. | F03D 17/00 73/602 |
| 2018/0043492 A1 * | 2/2018 | Ando ................. | B23Q 17/12 |

FOREIGN PATENT DOCUMENTS

CN 108956142 A 12/2018

* cited by examiner

*Primary Examiner* — Raul J Rios Russo
*Assistant Examiner* — Carl F. R. Tchatchouang
(74) *Attorney, Agent, or Firm* — Garcia-Zamor Intellectual Property Law; Ruy Garcia-Zamor; Bryan Peckjian

(57) ABSTRACT

A device for identifying a type of a bearing is provided. The device includes a detection unit for detecting a vibration frequency of the bearing, and an identification unit for identifying the type of the bearing based on the detected vibration frequency.

9 Claims, 1 Drawing Sheet

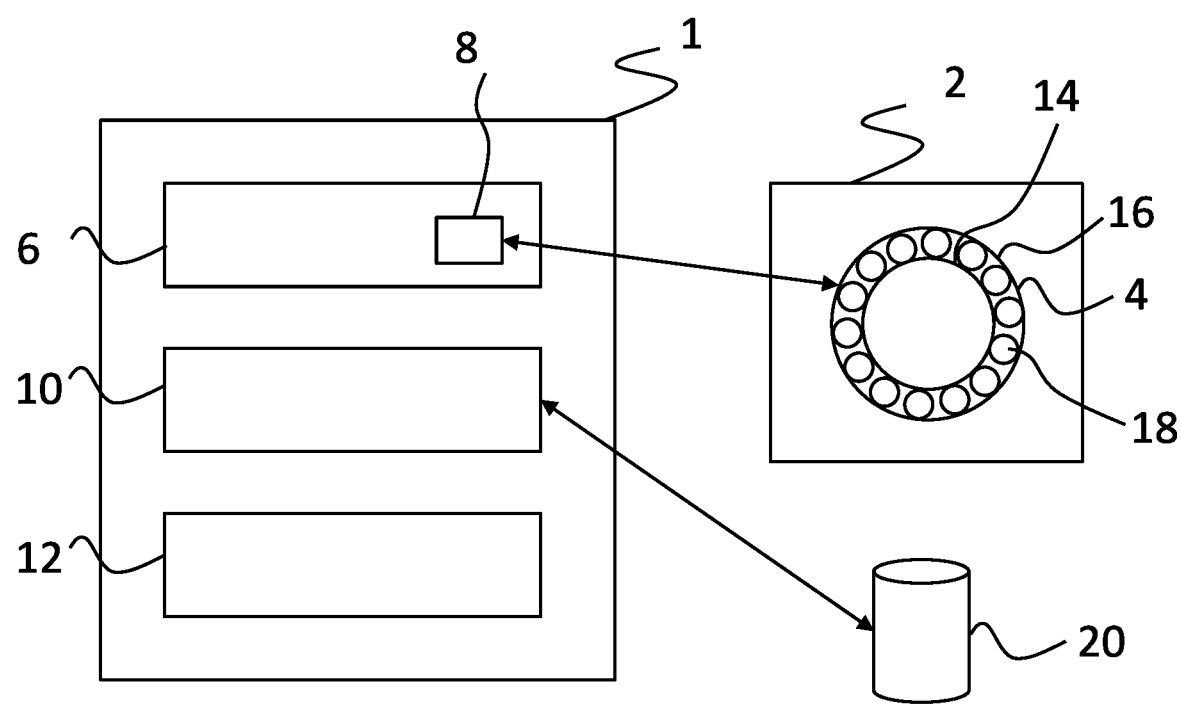

DEVICE FOR IDENTIFYING A TYPE OF A BEARING

CROSS-REFERENCE TO RELATED APPLICATIONS

This application claims priority to German Patent Application no. 102020204228.4, filed Apr. 1, 2020, the contents of which is fully incorporated herein by reference.

TECHNICAL FILED OF THE INVENTION

The present invention relates to a device for identifying a type of a bearing having a detection unit for detecting a vibration frequency of the bearing, and an identification unit for identifying the type of the bearing based on the detected vibration frequency.

BACKGROUND OF THE INVENTION

Bearings are used in different kind of machines, for example rotating machines. Sometimes, the built-in bearings are unknown to the customers. In such a case, it is difficult to replace a bearing and to have an appropriate bearing ready when the bearing deteriorates or is faulty. Further, there are also some difficulties in the detection and analysis of the bearing condition when the type of bearing is unknown. It is therefore object of the present invention to provide a simple way of identifying an already installed bearing.

SUMMARY OF THE INVENTION

An aspect of the device may comprise a detection unit for detecting a vibration frequency of the bearing, and an identification unit for identifying the type of the bearing based on the detected vibration frequency. The bearing may be for example part of a machine. The device may be part of the machine or may be arranged outside of the machine and may be connected to the machine or the bearing for the purpose of the identification.

In order to detect the vibration frequency, the detection unit may monitor the machine and/or the bearing and may detect the vibration frequency directly via the vibration of the bearing or indirectly via a vibration of the machine.

If the identification unit has identified the type of the bearing, i.e. the bearing designation, based on the detected vibration frequency, the information about the bearing designation may be used for making an accurate diagnosis of the bearing as the specific characteristics of the bearing are now known. Furthermore, the identification of the type of the bearing may be used for several estimations of the bearing, for example of the service life of the bearing or any other condition of the bearing. In addition, as the bearing has been identified, the identification and the type of the bearing may be used for providing an appropriate replacement bearing if necessary. Further, if a failure or deterioration of the bearing occurs, the information about the bearing designation and the specific features and characteristics of the bearing may be used for a prognosis about the cause of the deterioration or failure. In particular, the bearing designation and the knowledge about the cause may be used for replacing single parts of the bearing.

The vibration frequency may correspond to a frequency of a rolling element passing the inner or outer race of the bearing, a frequency of a spin of a rolling element and/or a vibration frequency of the machine in which the bearing is integrated.

According to a further embodiment, the identification unit is adapted to compare the detected vibration frequency with multiple vibration frequencies being stored in a database and to identify the type of the bearing based on the result of the comparison.

In one embodiment, instead of vibration frequencies, the database may contain the dimensions of multiple bearings. Based on these bearing dimensions, the bearing frequencies can be derived as a function of a shaft speed of the machine and then, the identification unit can compare the detected vibration frequency with the derived bearing frequencies for identifying the type of the bearing.

The database may be part of the device or may be arranged remote to the device. The identification unit may communicate with the database via for example radio communication. In the database, a plurality of vibration frequencies with corresponding bearing types may be stored. Thus, the identification unit may compare the detected vibration frequency with multiple vibration frequencies and, if there is an identical stored vibration frequency, the corresponding type of the bearing may be identified as the type of the present bearing.

According to a further embodiment, the detected vibration frequency has a vibration pattern and the identification unit is adapted to compare the vibration pattern with multiple vibration patterns.

In addition or alternatively, the database may contain multiple vibration patterns, wherein each vibration pattern corresponds to a specific type of bearing. In such a case, the identification unit may determine a vibration pattern of the detected vibration frequency, i.e. a specific sequence of values within the detected vibration frequency and may compare the determined vibration pattern with the stored vibration patterns.

For sensing the vibration signal, the detection unit may comprise a vibration sensor. The vibration sensor may be used for measuring or sensing the vibration of the whole machine or the bearing inside the machine. The vibration sensor can be connected with the detection unit via cable or may communicate with the detection unit via radio communication.

A preferred way of performing the identification of the type of the bearing may be based on a transformation of the vibration signal from the time domain to the frequency domain, for example using a Fast Fourier Transform algorithm.

In this case, the device further comprises a calculation unit for transforming the sensed vibration signal from the time domain, to the frequency domain. When the signal is in the frequency domain, the identification unit may detect one or more frequencies in the frequency domain signal representing the vibration pattern. In the frequency domain, the signal frequencies can be easier detected than in the time domain as for example noise frequencies can be specified and eliminated.

In particular, when the condition of the bearing deteriorates, or if the bearing is heavily loaded, there will be indicators at certain frequencies in the frequency domain. Pattern matching may be used with the frequencies identified in the frequency domain and then may be compared with a known repository of bearing frequencies stored in the database.

In a preferred embodiment, the detection unit may be adapted to decide whether the bearing deteriorates or is loaded and, if this is the case, may detect the vibration frequency of the bearing. The deterioration can be determined due to the occurrence of a specific vibration frequency. Defective or deteriorated bearings, or a heavy loaded bearing, show a harmonic vibration pattern with a base frequency corresponding to a characteristic frequency of the type of the bearing.

When using the proposed device, it is possible to identify a bearing, which is already installed in a machine, without knowing the specific type of the bearing. With the proposed device, it is only necessary to detect the vibration frequency of the bearing without any further knowledge. The detected vibration frequency may then be compared with stored frequencies which correspond to specific types of bearings. Thus, it is possible to identify a bearing also after installation within a machine.

A further aspect of the present invention relates to a method for identifying a type of a bearing, wherein the method comprises detecting a vibration frequency of the bearing and identifying the type of the bearing based on the detected vibration frequency.

An even further aspect of the present invention relates to a computer program product comprising a computer program code which is adapted to prompt a control unit, e.g. a computer, and/or a computer of the above discussed device to perform the above discussed steps. The database may also be implemented by the computer program.

The computer program product may be a provided as memory device, such as a memory card, USB stick, CD-ROM, DVD and/or may be a file which may be downloaded from a server, particularly a remote server, in a network. The network may be a wireless communication network for transferring the file with the computer program product.

Further preferred embodiments are defined in the dependent claims as well as in the description and the FIGURES. Thereby, elements described or shown in combination with other elements may be present alone or in combination with other elements without departing from the scope of protection.

BRIEF DESCRIPTION OF THE DRAWINGS

In the following, preferred embodiments of the invention are described in relation to the drawings, wherein the drawings are exemplarily only, and are not intended to limit the scope of protection. The scope of protection is defined by the accompanied claims.

The FIGURE shows:

FIG. 1: a schematic view of a device for identifying a type of a bearing.

In the following same or similar functioning elements are indicated with the same reference numerals.

DETAILED DESCRIPTION OF SOME EMBODIMENTS

FIG. 1 shows a device 1 for identifying a bearing 4 which may be part of a machine 2. The bearing 4 may already be installed in the machine 2, without any knowledge about the type of the bearing 4.

In order to identify the type of the bearing 4, for example, to find an appropriate replacement for the bearing 4, the device 1 comprises the detection unit 6. The detection unit 6 may detect a vibration frequency of the bearing 4 directly or may detect the vibration frequency of the bearing 4 indirectly via a vibration of the machine 2. For detecting the vibration frequency, the detection unit 6 may comprise a vibration sensor 8. The vibration sensor 8 (although shown outside of the bearing 4) may be arranged within the bearing 4 for detecting the vibration frequency within the bearing 4, may be located on a housing of the machine 2, on a housing of the bearing 4 or inside the housing of the bearing 4.

The vibration sensor 8 may sense vibrations of different parts of the bearing 4, for example a vibration when a rolling element 18 passing the inner or outer race of the bearing 4, a frequency of a spin of a rolling element 18 and/or a vibration frequency of the machine 2 in which the bearing is integrated. It should be noted that, although the bearing 4 is shown as a ball bearing with an inner ring 14, an outer ring 16 and balls 18, any other kind of bearing 4 may be used, for example a roller bearing, a tapered roller bearing or the like.

An identification unit 10 of the device 1 may use the sensed vibration frequency for identifying the type of the bearing 4. For example, the identification unit 10 may communicate with a database 20 for comparing the detected vibration frequency of the bearing 4 with vibration frequencies being stored in the database 20. Each stored vibration frequency may correspond to a specific type of bearing and the identification unit 10 may identify the type of the bearing by performing a pattern matching between the sensed vibration frequency and the stored vibration frequencies.

In another embodiment, the database 20 may contain the dimensions of multiple bearings. Based on these bearing dimensions, the bearing frequencies can be derived as a function of a shaft speed of the machine 2. In this case, the identification unit 10 compares the detected vibration frequency with the derived bearing frequencies for identifying the type of the bearing 4.

In a further embodiment, the detection unit 6 may be adapted to decide whether the bearing 4 deteriorates or is loaded and, if this is the case, may detect the vibration frequency of the bearing 4. The deterioration can be determined due to the occurrence of a specific vibration frequency. Defective or deteriorated bearings, or a heavy loaded bearing, show a harmonic vibration pattern with a base frequency corresponding to a characteristic frequency of the type of the bearing. Further, the identification unit 10 may identify, in addition to the type of the bearing 4, also the parts of the bearing 4 which may need to be replaced.

In a preferred embodiment, the vibration sensor 8 may sense of the vibration frequency as a vibration signal in the time domain. A calculation unit 12 of the device 1 may transform the sensed vibration signal from the time domain to the frequency domain, for example using a Fast Fourier Transform algorithm. Based on the frequency domain signal, identification unit 10 may detect one or more frequencies in the frequency domain signal which represent a vibration pattern of the bearing 4. Based on this vibration pattern, the identification unit 10 may compare the sensed vibration signal with the stored vibration signals and identify the bearing 4, as described above.

In summary, when using the proposed device, it is possible to identify a bearing, which is already installed in a machine, without any a priori knowledge about the specific type of the bearing. It is only necessary to detect the vibration frequency of the bearing, which may then be compared with stored frequencies which correspond to specific known types of bearings. Thus, it is possible to identify a bearing also after installation within a machine.

The invention claimed is:

1. A device for identifying a type of a bearing installed in a machine comprising:
    a detection unit comprising a vibration sensor for detecting a vibration frequency of the bearing, and
    an identification unit comprising a computer for identifying the type of the bearing based on the vibration frequency detected, wherein the identification unit is adapted to derive multiple bearing frequencies as a function of a shaft speed of the machine and of dimensions of multiple bearings being stored in a database, to compare the detected vibration frequency with the derived vibration frequencies and to identify the type of the bearing based on the result of the comparison.

2. The device according to claim 1, wherein the identification unit is adapted to compare the detected vibration frequency with multiple vibration frequencies being stored in a database and to identify the type of the bearing based on the result of the comparison.

3. The device according to claim 2, wherein the detected vibration frequency has a vibration pattern and wherein the identification unit is adapted to compare the vibration pattern with multiple vibration patterns.

4. The device according to claim 1, wherein the device further comprises a calculation unit for transforming the sensed vibration signal from the time domain to the frequency domain by a Fast Fourier Transform algorithm.

5. The device according to claim 4, wherein the identification unit is adapted to detect one or more frequencies in a frequency domain signal representing the vibration pattern.

6. The device according to claim 1, wherein the detection unit is further adapted to detect whether the bearing deteriorates and/or is loaded, and if so, to detect the vibration frequency of the bearing, and wherein the identification unit is adapted to identify the type of the deteriorated or loaded bearing.

7. The device according to claim 1, wherein the vibration frequency corresponds to a frequency of a rolling element passing the inner or outer race of the bearing, a frequency of a spin of a rolling element and/or a vibration frequency of a machine in which the bearing is integrated.

8. A device for identifying a type of a bearing installed in a machine comprising:
a detection unit comprising a vibration sensor for detecting a vibration frequency of the bearing, and
an identification unit comprising a computer for identifying the type of the bearing based on the vibration frequency detected,
wherein the vibration frequency detected has a vibration pattern and wherein the identification unit is adapted to compare the vibration pattern with multiple vibration patterns, and
wherein the identification unit is adapted to derive multiple bearing frequencies as a function of a shaft speed of the machine and of dimensions of multiple bearings being stored in a database, to compare the detected vibration frequency with the derived vibration frequencies and to identify the type of the bearing based on the result of the comparison.

9. A device for identifying a type of a bearing installed in a machine comprising:
a detection unit comprising a vibration sensor for detecting a vibration frequency of the bearing, and
an identification unit comprising a computer for identifying the type of the bearing based on the vibration frequency detected,
wherein the identification unit is adapted to detect one or more frequencies in a frequency domain signal representing the vibration pattern, and
wherein the identification unit is adapted to derive multiple bearing frequencies as a function of a shaft speed of the machine and of dimensions of multiple bearings being stored in a database, to compare the detected vibration frequency with the derived vibration frequencies and to identify the type of the bearing based on the result of the comparison.

* * * * *